(12) United States Patent
Energin

(10) Patent No.: US 9,849,384 B1
(45) Date of Patent: Dec. 26, 2017

(54) VIEWPORT SELECTION SYSTEM

(71) Applicant: Amazon Technologies, Inc., Seattle, WA (US)

(72) Inventor: Semih Energin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 464 days.

(21) Appl. No.: 14/571,953

(22) Filed: Dec. 16, 2014

(51) Int. Cl.
| | |
|---|---|
| A63F 9/24 | (2006.01) |
| A63F 13/5252 | (2014.01) |
| G09G 5/14 | (2006.01) |
| H04N 7/18 | (2006.01) |
| H04N 5/247 | (2006.01) |

(52) U.S. Cl.
CPC .......... *A63F 13/5252* (2014.09); *G09G 5/14* (2013.01); *H04N 5/247* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 2003/0032479 A1* | 2/2003 | LeMay | .................. | G07F 17/32 463/32 |
| 2004/0102244 A1* | 5/2004 | Kryuchkov | ............. | G07F 17/32 463/32 |
| 2004/0102245 A1* | 5/2004 | Escalera | ............. | G07F 17/3211 463/32 |
| 2006/0258446 A1* | 11/2006 | Nguyen | .............. | G07F 17/3276 463/30 |
| 2008/0032801 A1* | 2/2008 | Brunet de Courssou | .................. | G07F 17/32 463/42 |
| 2008/0227542 A1* | 9/2008 | Yoshizawa | .............. | G07F 17/32 463/31 |
| 2008/0300053 A1 | 12/2008 | Muller | | |
| 2010/0227689 A1* | 9/2010 | Brunet De Courssou | ................. | G07F 17/32 463/37 |
| 2014/0038708 A1 | 2/2014 | Davison et al. | | |
| 2014/0066178 A1* | 3/2014 | Kelly | ..................... | H04N 13/04 463/25 |
| 2014/0256417 A1* | 9/2014 | Maddhali | .............. | G07F 17/323 463/29 |
| 2015/0087413 A1* | 3/2015 | Traphagen | .......... | G07F 17/3206 463/31 |

* cited by examiner

*Primary Examiner* — Paul A D'Agostino
(74) *Attorney, Agent, or Firm* — Baker & Hostetler LLP

(57) ABSTRACT

Techniques for enabling selection of one or more viewports from a scene representation are disclosed herein. In some aspects, scene configuration information including a position of at least one viewport relative to the scene may be received. Each of the at least one viewport may be associated with a streaming camera view. A scene representation may then be defined based, at least in part, on the scene configuration information. One or more viewport representations corresponding to each of the at least one viewport may be positioned within the scene representation, based, at least in part on, the scene configuration information. The scene representation, including the at least one viewport representation, may be displayed, for example, to a user. Each viewport representation may allow the respective streaming camera view associated with the corresponding viewport may to be displayed, such as by selection of each viewport representation.

20 Claims, 10 Drawing Sheets

VIEWPORT SELECTION SYSTEM

BACKGROUND

Streaming of image and video content is become increasingly widespread and popular. Content may often be streamed from a provider, including, for example, one or more servers, to a remote client device over a network, such as the Internet. In some applications, including video games, images or video content may be streamed from multiple viewports, such that a user may access one or more of the multiple streaming viewports at any given time. Each of the different viewports may be associated with a view from a different respective camera perspective relative to a scene. Managing multiple viewports, or camera perspectives, may present difficulties. For example, users may often become disoriented with respect to perspectives associated with the different viewports relative to one another and relative to a scene as a whole. In particular, it may be difficult to ascertain the spatial relationships among multiple viewports, and this problem may sometimes be increased when the viewports move further apart in distance from one another.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
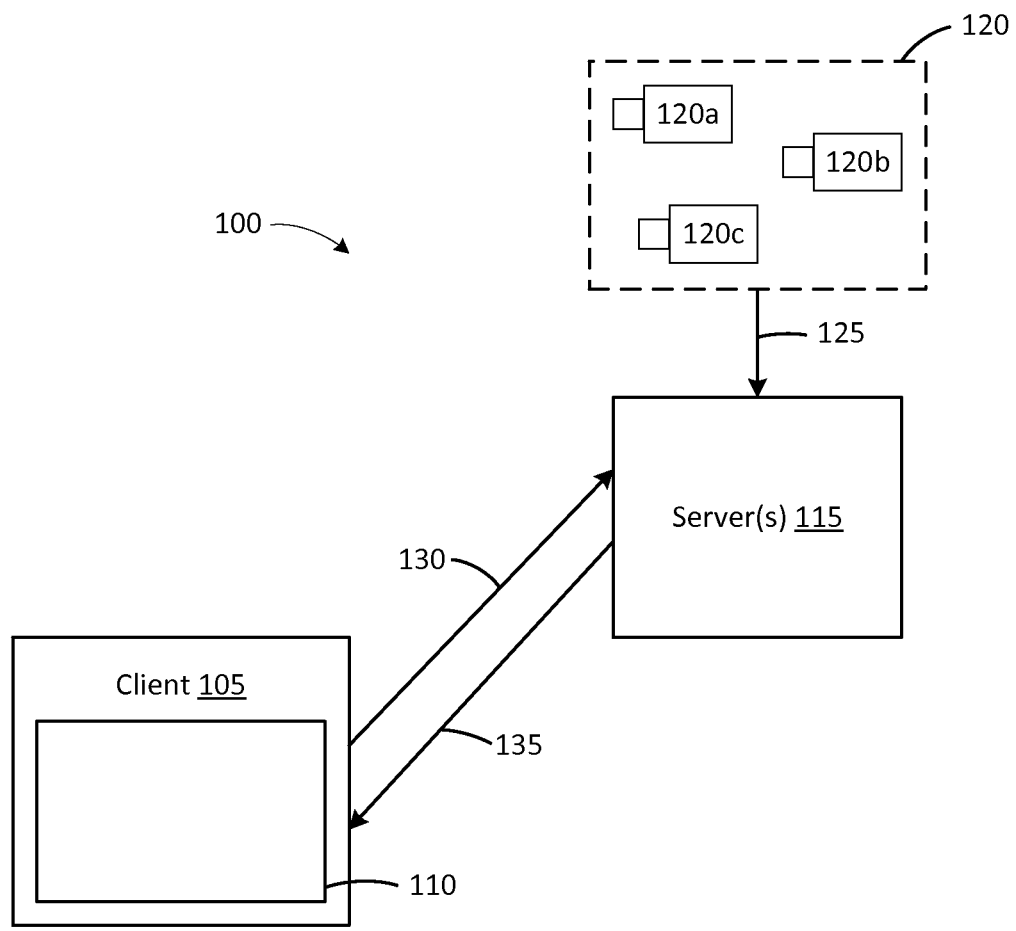
FIG. 1 is a diagram illustrating an example computing system for enabling viewport selection in a scene representation, in accordance with the present disclosure.

Techniques for enabling selection of a viewport associated with a streaming camera view in a scene representation are described herein. In one aspect, configuration information of a scene may be received, for example, by a client device from a server. The scene configuration information may include a position of at least one viewport relative to the scene. Each viewport may be associated with a streaming camera view, for example, streaming from the server. In one example, streaming camera views may be associated with a content item or simulation, such as a video game. The client device may define a scene representation based on the received scene configuration information. For example, the scene representation may include a baseball field in a particular video game example. A corresponding viewport representation of each of at least one viewport may be positioned within the scene representation based on the received scene configuration information. The scene representation, including the at least one viewport representation, may then be displayed, for example, via a client device to a user. Each viewport representation may allow the respective streaming camera view associated with the corresponding viewport may to be displayed, such as by selection of each viewport representation. In this way, multiple streaming camera views may be easily accessed via a scene representation. In some aspects, streaming camera views (e.g., image data) may only be transmitted upon selection of the particular viewport representation associated with the camera view. In another aspect, when a particular viewport is selected, streaming camera views associated with other viewports may be disabled and or not transmitted. In this way, bandwidth resources used to communicate the streaming image data may be reduced. Similarly, by not displaying all the streaming camera views associated with a scene constantly and at one time, the client device may conserve processing and memory resources and battery resources as well.

In some examples, the streaming camera views may be associated with real physical cameras, for example, used to monitor a building or facility, to hold a video conference, etc. In these cases, the scene configuration information may include physical location information of the one or more cameras generating the camera views relative to a floor plan or map (the scene). In these cases, the scene configuration information may also include graphic information associated with the scene, such as associated with a conference or meeting occurring at multiple locations simultaneously, multiple locations to be monitored, multiple video simulations, etc. Using the scene configuration information, the client device may define a scene representation, such as a floor plan or map of one or more buildings in the conference or monitoring scenarios. In other aspects, the server or other computing device may define the scene representation and send the scene representation to the client device.

In some examples, positioning each viewport in the scene representation may include representing each viewport in the scene representation (e.g., multiple bases on a baseball field, multiple rooms in a building, etc.) by a selectable icon, such as a camera. In other aspects, each viewport may be represented by one or more images or video associated with the respective streaming camera view.

In some aspects, a selection of a first viewport representation corresponding to a first viewport from the scene representation may be received. The respective streaming camera view for the first viewport may then be displayed, for example, in place of, in front of, or in combination with the scene representation. A request to return from the respective streaming camera view for the first viewport back to the scene representation may subsequently be received. The scene representation may then again be displayed. The streaming camera view associated with each viewport representation in the scene representation may be similarly selected and de-selected. In this way, the scene representation may enable navigating multiple streaming camera views, while maintaining and visually representing spatial relationships between the multiple streaming camera views.

In some aspects, the scene configuration information may include a view perspective. The view perspective may include a first-person perspective, a top-down perspective, an isometric perspective, or any other perspective. In some cases, the view perspective may be from the perspective/location of a user of the client device. In some examples, the view perspective may be from the perspective of a character in a video game, etc. The scene representation may be generated from the view perspective, such that the corresponding viewport representation of each of the at least one viewport within the scene representation may be positioned relative to the view perspective. In some cases, the view perspective may change, for example, when a player in a video game moves. In this scenario, the scene representation may change based on received updated view perspective information. Each viewport representation in the scene representation may then be changed relative to the change in the view perspective. In this way, a current location/perspective of a user may be represented while spatial relationships between multiple viewports are maintained.

In some examples, viewports may be added, deleted, or modified. In one such example, updated position information associated with at least one viewport may be received. The corresponding viewport representation of each of the at least one viewport in the scene representation may be repositioned based on the updated position information. In the video game or other simulation scenario, viewports may be freely added, deleted, or modified. In some examples, each viewport may be associated with a direction, a camera view angle, lighting information, quality, zoom, visual effects, etc. Any one or more of these attributes may be adjusted for each viewport. In the real-life monitoring, adjustment of any of the attributes may adjust physical operation of a camera associated with a viewport.

In some examples, the scene representation may include a two dimensional model, such as a map or the like. In other examples, the scene representation may include a three dimensional model.

An example system 100 for enabling selection of one or more viewports associated with a streaming camera view from a scene representation is shown in FIG. 1. System 100 may include a computing node or client device 105 in communication with one or more servers 115. The client device 105 may include a display 110, for example, to display content. The server(s) 115 may be in communication with one or more cameras 120, such as cameras 120a, 120b, 120c.

In one example, the client device 105 may request the initiation of a content item, such as a video game, or initiation of a simulation or other monitoring interface, program, application, etc., at 130. The server(s) 115 may configure and/or access information associated with the requested content item or interface, and establish communication with one or more cameras 120, for example, associated with the content item or interface.

Unless otherwise indicated, the term camera is used herein to include both physical cameras and virtual cameras, such as may be used in a video game or other simulation. In a first example, cameras 120a, 120b, 120c may be associated with physical cameras. The server 115 may first request and subsequently receive camera views associated with each camera 120a, 120b, 120c, for example, via one or more networks at 125. In another example, each of cameras 120a, 120b, 120c may be associated with a virtual camera, for example, in a video game or other simulation. Each virtual camera 120 may be embodied in program code, for example, generated by or with a running content item, such as a video game on the server 115, and may be associated with one or more characteristics. In either scenario, each of cameras 120a, 120b, 120c, may be associated with a camera view. The camera view may include one or more images, video, or a combination thereof (generally referred to as image data). In some aspects, one or more camera views may include constant image data. In other cases, one or more of cameras 120a, 120b, 120c may include discrete image data, for example, connected to and controlled by motion sensors and the like. Cameras 120a, 120b, 120c may have certain characteristics, including a location, a direction, a camera view angle, lighting information, quality (e.g., resolution), zoom, visual effects, etc.

The server 115 may organize, process, and otherwise condition the image data associated with cameras 120a, 120b, 120c. The server 115 may then generate, compile, and/or access scene configuration information of at least one scene associated with the image data generated by at least one of cameras 120a, 120b, 120c. In other aspects, the scene configuration information may include any of maps, floor plans, schematics, etc., for example associated with a monitoring, conferencing, or other simulation-type interface.

The server 115 may also include with the scene configuration information, position and/or characteristic information associated with each of cameras 120a, 120b, 120c, as described above. The position, and in some cases, the characteristic information, may be defined relative to the scene configuration information. In some cases, the scene configuration may include camera information, such as location, direction, angle, orientation, zoom, field of view, and like. The scene configuration information may also include information associated with one or more objects in the scene, such as orientation, size, scale, rotation, angle, state and/or speed of various objects and geometries. The scene configuration information may also include information such as a physical or virtual geography associated with the scene, an associated video game level, identifications of associated characters or objects, and the like. The server 115 may communicate the scene configuration information and position and/or characteristic information to the client and begin streaming one or more of the camera views associated with cameras 120a, 120b, 120c at 135.

According to the techniques described herein, the client device 105 may define a scene representation based, at least in part on the received scene configuration information. A viewport representation corresponding to each streaming camera view of cameras 120a, 120b, 120c may be created and positioned in the scene representation, for example, based on the received scene configuration information and position/characteristic information associated with each camera 120a, 120b, 120c. The client 105 may display the scene representation with viewport representations corresponding to the streaming camera views of cameras 120a, 120b, 120c via display 110. Each viewport representation may allow the respective streaming camera view associated with the corresponding viewport may to be displayed. For example, in some cases, by selecting a viewport representation in a particular manner, the streaming camera view associated with the respective camera 120 may be displayed. The scene representation may be displayed at any time, for example, via a toggle or other selection, when a streaming camera view is displayed. Another viewport representation may then be selected, and displayed, and so on. In this way, switching between the scene representation and a particular streaming camera view/viewport is possible. The scene representation may maintain physical or other relative locations of the cameras 120*a*, 120*b*, 120*c* associated with streaming camera views via viewport representations in the scene representation to further enable easy, intuitive, and relational management of multiple streaming camera views.

In other examples, the described techniques for enabling selection of one or more viewports associated with a streaming camera view from a scene representation may be used in other applications. In one example, multiple streaming camera views may be associated with multiple users, for example, attending a virtual conference. The camera views may be generated by a webcam or the like. A scene representation may be defined that displays the relative locations of each of the conference members associated with a streaming camera view. The conference members, and the associated cameras, may be located in multiple rooms and/or floors of a building. In this scenario, the scene representation may include a two or three dimensional floor plan or model of the building. In other cases, conference members may be located in different buildings in the same city or metropolitan area, different states, countries, etc. In these scenarios, the scene representation may include a geographical map showing the location of each member with a viewport representation. In another example, each streaming camera view may be associated with a different room or piece of machinery in a building, for example, in a factory monitoring application. In this example, the scene representation may include a detailed map or floor plan of the building, represented in two or three dimensions, and including representations of one or more machines or equipment.

These above examples are given for illustrative purposes. It should be appreciated that the described techniques may be applicable and provide similar benefits in a variety of scenarios besides video games, simulations, monitoring, and conferences as described above.

Figure 2:
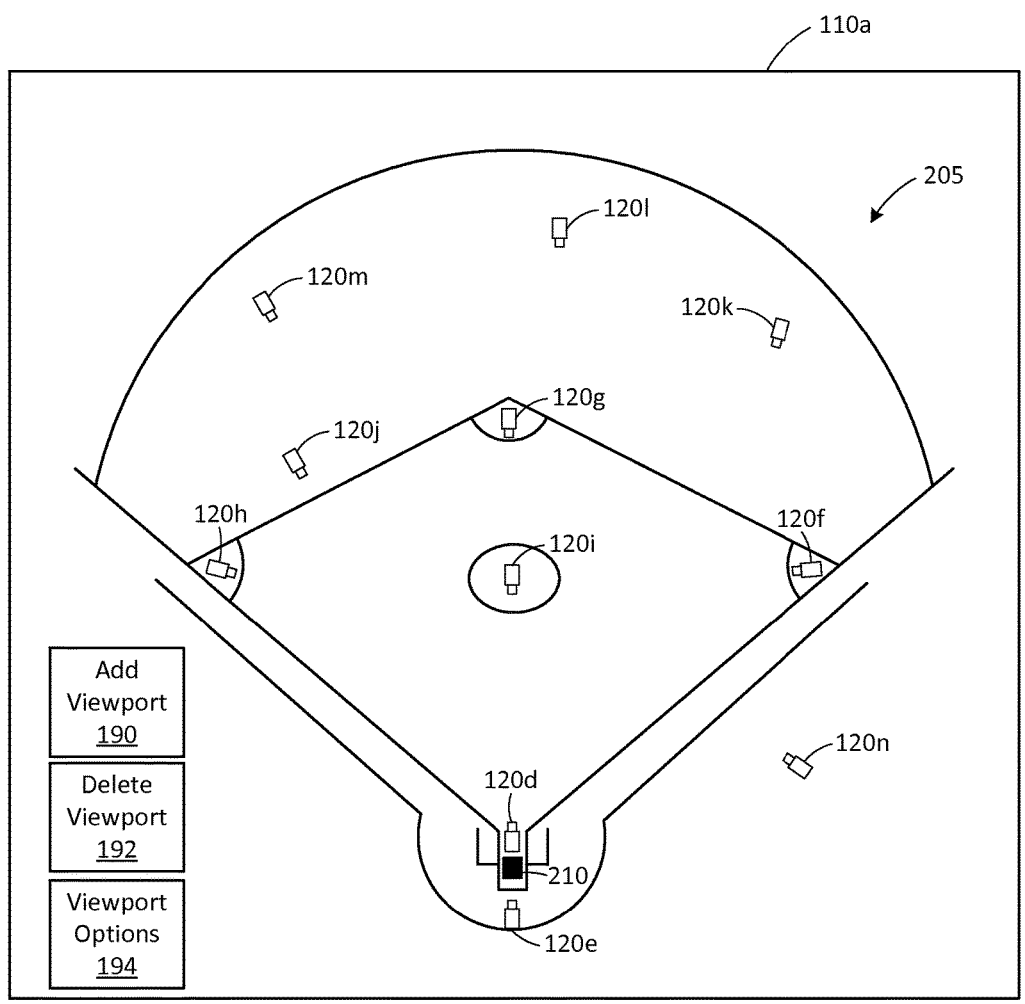
FIG. 2 is a diagram illustrating an example scene representation of a baseball game including multiple viewport representations, in accordance with the present disclosure.

Referring next to FIG. 2, an example scene representation 205 on display 110*a* of a client device 105 is shown. The scene representation 205 may be generated by system 100, and may include a baseball field and multiple players or athletes, each represented by viewport representations in the form of camera icons 120. The camera icons 120*d* through 120*n* may be associated with streaming camera views of each of the players on the field, such as players or characters on first, second, and third bases, home plate, the umpire, short stop and outfielders. For example, viewport representation 120*d* may be associated with a player on home plate, e.g., the batter 210. In some aspects, one or more of viewport representations 120 may be associated with fixed places or locations within the scene representation, such as viewport representation 120*j* positioned off of the field between first and second base. In some cases, any number of viewports may be configured or added, for example, to view the ball being hit from different perspectives, to be able to see multiple payers in one view, and for any other reasons. In some cases, one or more of viewport representations 120*d* through 120*n* may be associated with fixed points on the field. In other aspects, one or more viewport representations may be associated with other dynamic aspects of the scene representation 205, such as the baseball.

It is noted that scene representation 205 is a particular non-limiting example of how a scene representation may be arranged and presented. In particular, in some cases, a scene representation may be three-dimensional, while, in other cases, a scene representation may be two-dimensional. In some cases, a user may be able to select, from a list of available options, how the scene representation may be arranged and presented, such as with different available perspectives, layouts, dimensionality, and other characteristics.

Each viewport representation 120 may be associated with a location on the field and may visually indicate a direction associated with the respective camera view. In this way, the physical relationship between each streaming camera view associated with the viewport representations 120 may be clearly displayed. Various levels of detail may be included in the scene representation 205, for example, based on computing resources of the client device 105, bandwidth resources of the connection between the server 115 and the client device 105, and so on.

In some cases, scene representation 205 may allow users to add additional viewports by, for example, selecting a desired position within scene representation 205 and selecting add viewport control 190. The added viewport may then be configured by, for example, selecting viewport options control 194, which may allow the user to select viewport options, such as position, location, direction, camera view angle, lighting information such as glare, brightness, filter, etc., quality, resolution, zoom, visual effects, and so on. In addition to newly added viewports, options for existing viewports may also be adjusted by, for example, selecting an existing viewport and then selecting viewport options control 194. Also, in some cases, viewports may be adjusted by, for example, selecting and dragging a viewport representation to a different location, or selecting and rotating the viewport representation to change the direction and/or angle of the corresponding viewport. Also, in some cases, selecting of a viewport representation may cause various icons to pop up for adjusting zoom, field of view, and other characteristics. Also, in some cases, a viewport may be deleted by, for example, selecting a viewport representation and then selecting delete view control 192. It is noted that instructions for adding, deleting, modifying and/or setting options for viewports may, for example, be received by a client and then communicated back to a server so that the server may responsively add, delete, modifying and/or setting options for viewports in accordance with the communicated instructions.

Figure 3:
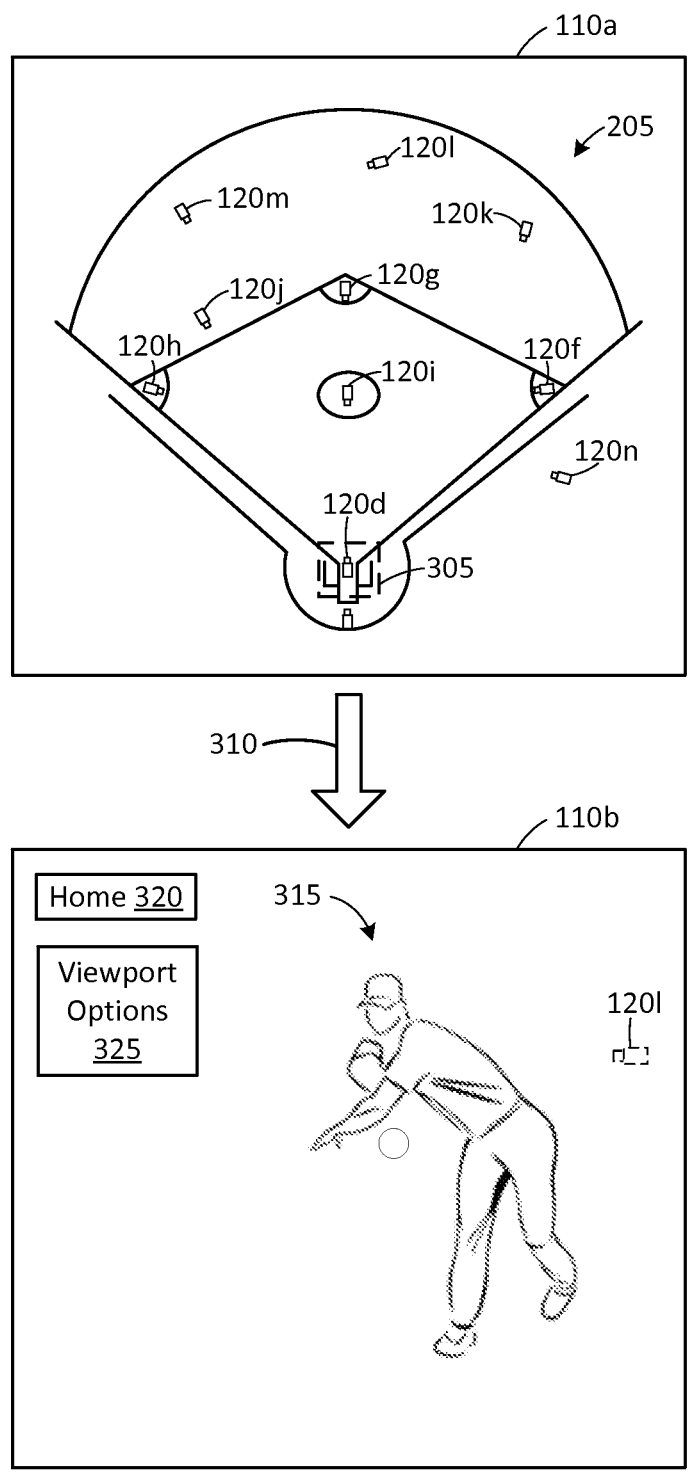
FIG. 3 is a diagram illustrating the selection of a viewport from an example scene representation of a baseball game including multiple viewport representations, in accordance with the present disclosure.

With reference to FIG. 3, viewport representation 120*d* of scene representation 205 described above in reference to FIG. 2, displayed on display 110*a*, may be selected at operation 305. The selection may display the streaming camera view 315 at operation 310 associated with viewport representation (camera) 120*d* in display 110*b*. The streaming camera view 315 may include a streaming camera view from the perspective of the batter 210, for example directed at the pitcher. In some aspects, display 110*b* may include a home control 320, a viewport options control 325, and/or or other similar selection controls. Selecting the home control 320 may display the scene representation 205 of display 110*a*, for example, to enable selection and subsequent display of another streaming camera view associated with another viewport representation 120 in scene representation 205. Selecting the viewport options control 325 may enable setting of viewport options for the displayed viewport, such as any of the example viewport options described above. In this way, each streaming camera view 315 may be fully adjustable and customizable.

In some cases, one or more viewport representations 120 may be included or integrated into the streaming camera view 315, such as viewport representation 120*i*. Viewport representation 120*i* may indicate a direction, such as the same direction as illustrated in scene representation 205, but modified to reflect the changed view perspective of the camera view 315. In this way, spatial relationships between multiple viewport representations 120 may be maintained. In some cases, selecting a viewport representation 120i may display the streaming camera view associated with viewport representation 120i directly, without first displaying scene representation 205. In this way, faster switching between multiple streaming camera views may be enabled.

Figure 4:
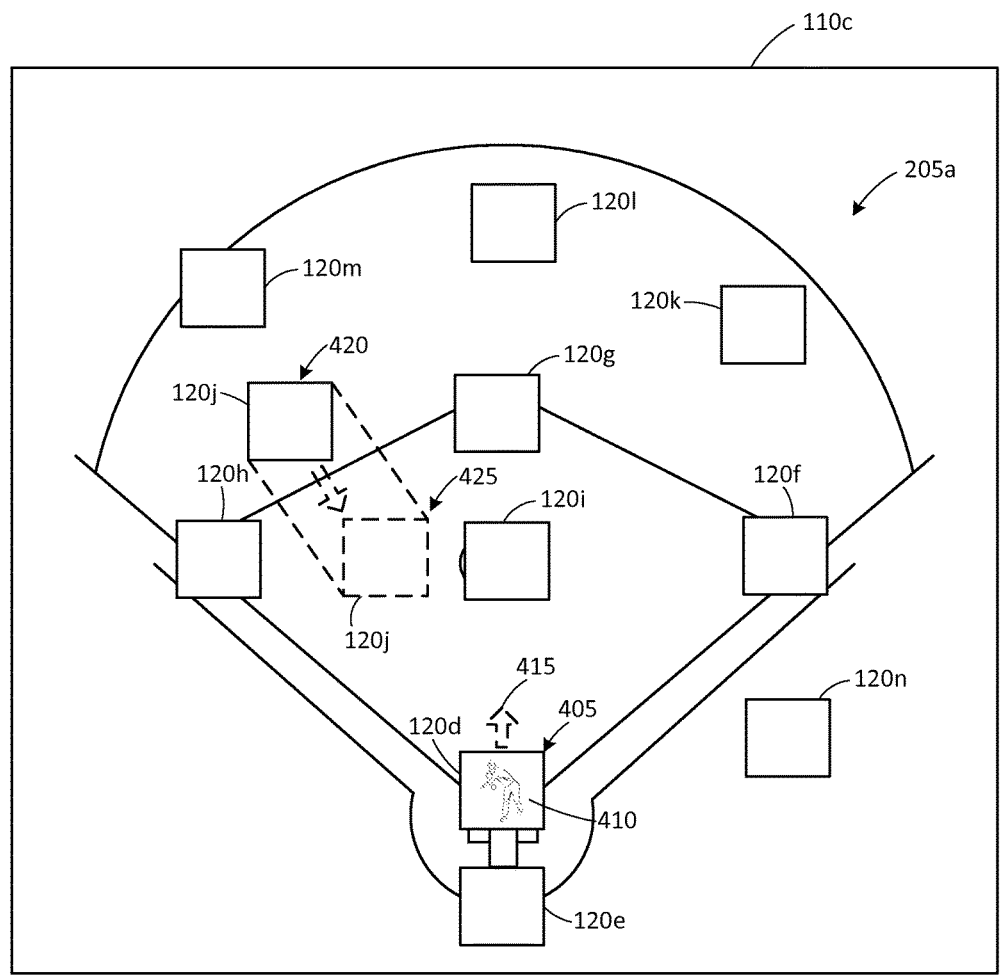
FIG. 4 is a diagram illustrating an example process of modifying a viewport representation in a scene representation of a baseball game including multiple viewport representations, in accordance with the present disclosure.

With reference to FIG. 4, an alternative scene representation 205a including multiple viewport representations 120 is shown in display 110c. Scene representation 205a may be of a baseball field and may include the same viewport representations 120d through 120n, as described in reference to FIGS. 2 and 3. However, viewport representations 120 of FIG. 4 may each display at least one image or a low fidelity video or portion thereof associated with the respective streaming camera view. For example, viewport representation 120d may include a small view block 405 that displays an image or a video 410 taken from the streaming camera view associated with viewport representation 120d. In the example illustrated, a pitcher is shown throwing the ball. In some cases, the viewport representation 120d may also include an indication 415 of the direction of the streaming camera view, for example via an arrow or other visual indicator. In some cases, text or other indicators of direction or other properties of each viewport may be displayed with the viewport representation 120. As illustrated, an image associated with only viewport representation 120d is shown. However, it should be appreciated that all or some of the viewport representations 120 may also include image or video data associated with the respective streaming camera views.

In one aspect, the position of the one or more viewports 120 may be dynamic, for example, based on other players' actions or other occurrences or events in a video game, based on changed physical locations of real-life cameras, etc. In other cases, a viewport representation 120 may be configured to move with one or more characters, objects, or based on other factors, for example in a video game. In this way, a user may select to track objects or characters, for example, by always having access to a streaming camera view co-located with the selected object or character. This may be represented by viewport representation 120j, which may initially be at a first location 420. The viewport associated with representation 120j may be associated the short stop character and may move dynamically in association with the short stop character. According to the content item, or according to user input, for example, in an interactive video game scenario, the shortstop, and hence the viewport representations 120j associated with the shortstop, may move toward the pitcher to position 425. In some cases, moving of a viewport associated with representation 120j may be initiated by a user via one or more selections, or may be in response to an aspect of the content item. In one scenario, the client device 105 may receive updated position information associated with at least one viewport, such as the viewport associated with representation 120j. In some cases, the selection to move a viewport representation 120j may include selecting and moving the viewport representation 120j in or relative to the scene representation 205a, for example, by selecting and dragging the viewport representation 120j to the desired location 425.

In either case, the position of the viewport representation 120j may be adjusted to reflect the most current position of that viewport relative to other viewport representations 120. Similarly, one or more of viewport representations 120 may be deleted, or modified as described above. In some cases, other viewport representations may be repositioned according to the received updated position information, for example, if the updated viewport representation is outside of the scene representation. In some cases, repositioning one viewport representation 120 may modify the position of one or more other viewport representations 120, for example, if the updated viewport representation is associated with the view perspective of the scene representation 205. This scenario will be described in greater detail below.

Figure 5:
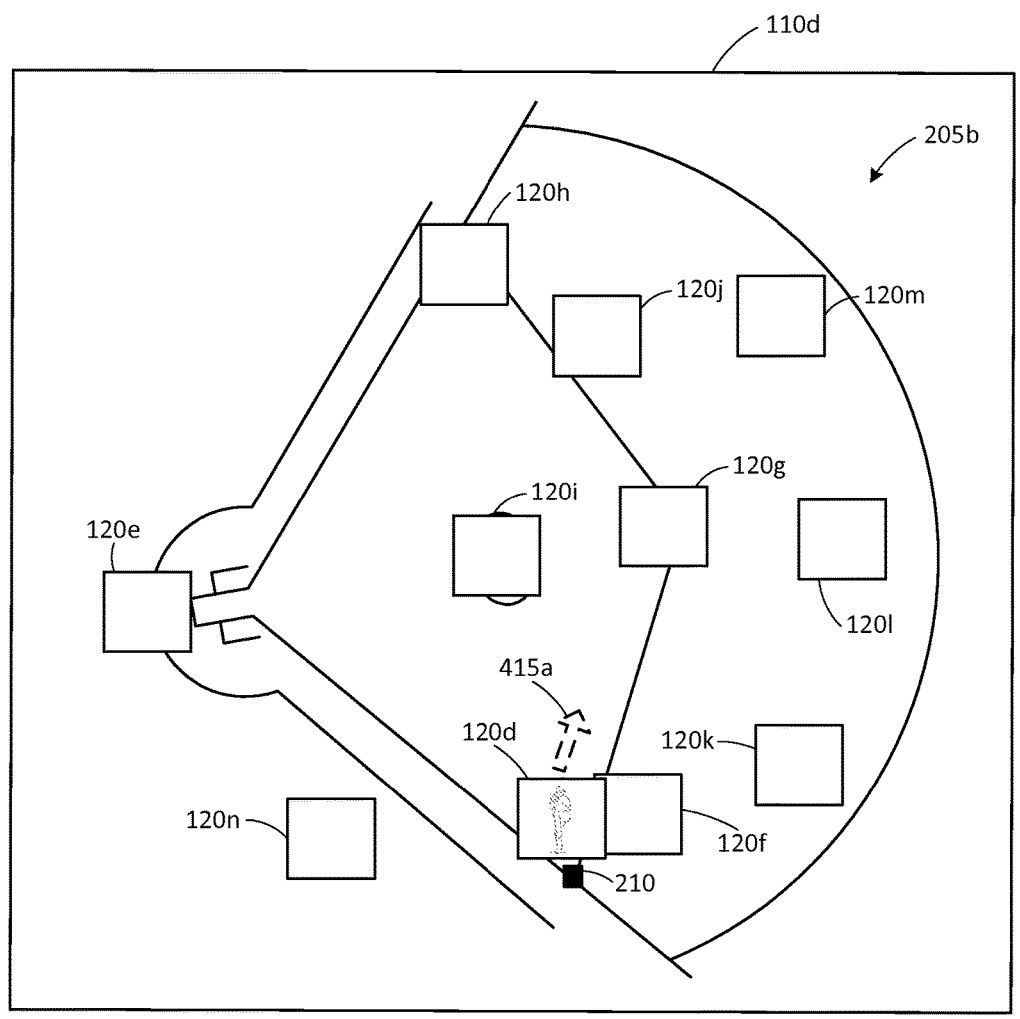
FIG. 5 is a diagram illustrating an example scene representation of a baseball game including multiple viewport representations with an updated view perspective, in accordance with the present disclosure.

FIG. 5 illustrates a modified scene representation 205b, for example displayed on display 110d of a client device 105. Scene representation 205b may include one or more aspects of scene representation 205a described above in reference to FIG. 4, including viewport representations 120d through 120n located on a baseball field. Scene representation 205b, may however, be associated with a different view perspective than scene representation 205a.

In the example illustrated, the view perspective of scene representation 205b may be linked to a player in the video game, such as batter 210, associated with viewport representation 120d. In other cases, the view perspective of scene representation 205b may be linked to one or more aspects of a video game unassociated with a viewport or viewport representation 120, for example, a current level, etc. As illustrated, the batter 210, after having hit the ball, may run to first base. The viewport representation 120d may also move to the position associated with first base. In some cases, the viewport representation 120d may continually display and update images or video of the streaming camera view associated with viewport representation 120d. In other cases, viewport representation 120d may update the display of images or video associated with the respective streaming camera view periodically, when the position of the viewport is stable and not moving, or based on other conditions. In either case, once the batter 210 and associated viewport representation 120d are at first base, the viewport representation may display one or more images 410a from the streaming camera view in direction 415a associated with viewport representation 120d. The one or more images/video 410a may include the second baseman preparing to throw the ball.

As illustrated, the view perspective of scene representation 205b may be linked to the player 210, the view representation 120d, and/or a direction 410a of viewport 120d. As a result, when any, or all, of the position of player 210, the view representation 120d, and/or a direction 410a of viewport representation 120d change, the view perspective of scene representation 205a may also change, for example, to scene representation 205b. In other scenarios, the view perspective of scene representation 205b may change or be updated according to other factors. For example, a user may manually select to change the view perspective of scene representation 205b. In another example, the view perspective and/or scene representation 205b may change to display an entirely different scene representation 205 from the same or different view perspective, for example, associated with another sport game (e.g., displaying a football field) of a content item or video game caused by a selection by the user, etc. The scene representation 205b and/or view perspective may also change according to, for example, movement of a player in a video game, for example, in a first person perspective. In this scenario, image data associated with viewport representations 120 may be displayed in the first perspective. Similarly, in one aspect, the view representation 120l positioned in display 110b associated with streaming camera view 315 may similarly display corresponding image data. It should be appreciated that the techniques described above can be applied to various other scenarios, and may include various techniques to dynamically adapt a scene representation to changing locations of one or more objects, characters, camera/viewport presentations, and the like.

In one aspect, techniques for adapting a view perspective of a scene representation 205 may include receiving an updated view perspective, for example in the form of selections made by a user, a running content item, etc. The scene representation 205 may then be modified based on the updated view perspective, for example at the client device 105, or in some aspects at the server 115. In some cases, the position of one or more viewports/viewport representations 120 may be affected by the changed view perspective. The one or more affected viewport representations 120 may then be repositioned in the scene representation 205 relative to the updated view perspective.

Figure 6:
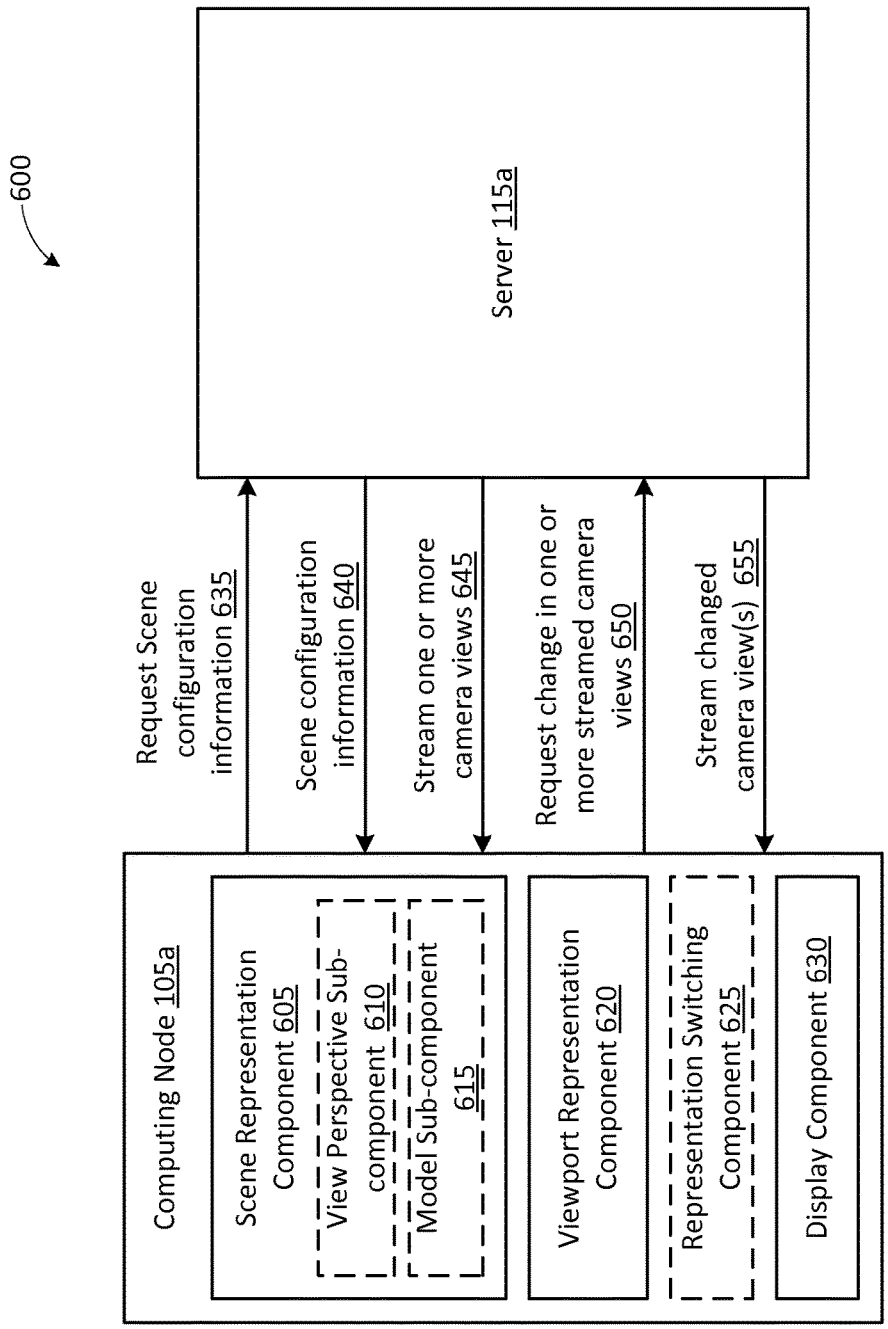
FIG. 6 is a diagram illustrating another example computing system for enabling viewport selection in a scene representation, in accordance with the present disclosure.

FIG. 6 illustrates another system 600 for enabling selection of one or more viewports associated with streaming camera views from a scene representation. System 600 may incorporate one or more aspects of system 100 described above. System 600 may include a client 105a in communication with one or more servers 115a, for example, via one or more networks. The client 105a may include a scene representation component 605, a viewport representations component 620, a display component 630, and in some cases, a representation switching component 625. In some aspects, the scene representation component 605 may include a view perspective sub-component 610 and/or a model sub-component 615.

In some aspects, the client 105a may first receive a request to initiate a content item, such as a video game, a simulation, a monitoring or conferencing interface, etc., from a user. The client 105a may initiate the content item or interface associated with the request. Also, upon receiving the request, the client 105a may request scene configuration information associated with the video game, simulation, etc., from the server 115a at 635. The server 115a may obtain information relating to the scene configuration information request and may establish communication with one or more cameras 120 (not shown). In some aspects, such as the content item or video game example, one or more virtual cameras may be activated, for example, by running a server portion of the content item or video game. The server 115a may subsequently send scene configuration information 640 to the computing node 105a. The scene configuration information sent at 640 may also include position information of at least one viewport. In some cases, the position information may include virtual position information, for example, relative to one or more scenes in a video game. In other cases, for physical cameras, the position information may include any of global positioning system (GPS) coordinates, map coordinates, latitude and longitude, or other physical position information, relative to one or more maps, floor plans, etc.

Using the scene configuration information sent at 640, the scene representation component 605 may generate a scene representation, such as scene representation 205 described above. In some aspects, the scene configuration information sent at 640 may additionally include a view perspective associated with one or more scenes. In this case, the view perspective sub-component 610 of the scene representation component 605 may modify the scene representation based on the view perspective, for example, as described above in reference to FIGS. 4 and 5. The viewport representation component 620 may, using the received position information of one or more cameras, position viewport representations 120 within the scene representation generated by the scene representation component 605. In some cases, the position of viewport representations 120 within the scene representation may be relative to the view perspective, for example, received from the server 115 and/or processed by the view perspective sub-component 610. The scene representation including the positions of at least one viewport representation 120 may be sent to the display component 630, which may display the scene representation, for example, to a user. In some cases, the display component 630 may include a graphic display, such as a monitor, touchscreen, and the like.

The server 115a may transmit or stream one or more camera views, for example associated with the viewport representations in the scene representation, at 645. The streaming camera views may be accessed, for example, by a user, by selection of a viewport representation in the scene representation. In some cases, the representation switching component 625 may enable switching between viewport representations and the scene representation, for example in response to one or more requests. In some aspects, the representation switching component 625 may instruct the server 115 which camera views to stream, for example based on viewport representations selections. In this way, only accessed camera views may be streamed by the server 115a, for example, to reduce bandwidth usage. In other cases, all or portions of each camera view may be transmitted or streamed periodically to the computing node 105a. In yet other cases, all of the camera views may be constantly streamed to the computing node 105a.

In one aspect, the computing node 105a may receive a request or instruction to display a streaming camera view, for example, via a selection of a viewport representation. The representation switching component 625 may access or request the selected streaming camera view from the server 115a, for example, at 650. Upon receiving the streaming camera view from the server 115a at 655, the representation switching component 625 may send or direct the streaming camera view to the display component 630. The display component 630 may subsequently display the selected streaming camera view, for example, as described above in reference to FIG. 3. The computing node 105a may also receive a request or instruction to display the scene representation, for example, via a selection, such as control 320 of FIG. 3. The representation switching component 625 may instruct/coordinate with the display component 630 to display the scene representation. Other streaming camera views may be selected and displayed in a similar manner.

In some aspects, the model sub-component 615 of the scene representation component 605 may define the scene representation by building or creating a two-dimensional or three-dimensional model. In some examples, this may include using image data associated with portions of one or more images to develop the scene representation. In some cases, the model may also be generated based, at least in part, on the scene configuration information. In one example, a framework (e.g., a preconfigured framework) may be generated based on the scene configuration information. For example, the baseball field 205 of FIGS. 2-5 may be generated based on the request received by the server 115a to initiate the baseball video game, for example based on a framework. Additional information may then be added to the basic framework, e.g., the field, including the stadium, crowds, advertisements, jerseys, etc., for example, by using one or more images from at least one streaming camera view 120. In other cases, the model sub-component 615 may use video data received from at least one streaming camera view to generate the scene representation.

Figure 7A:
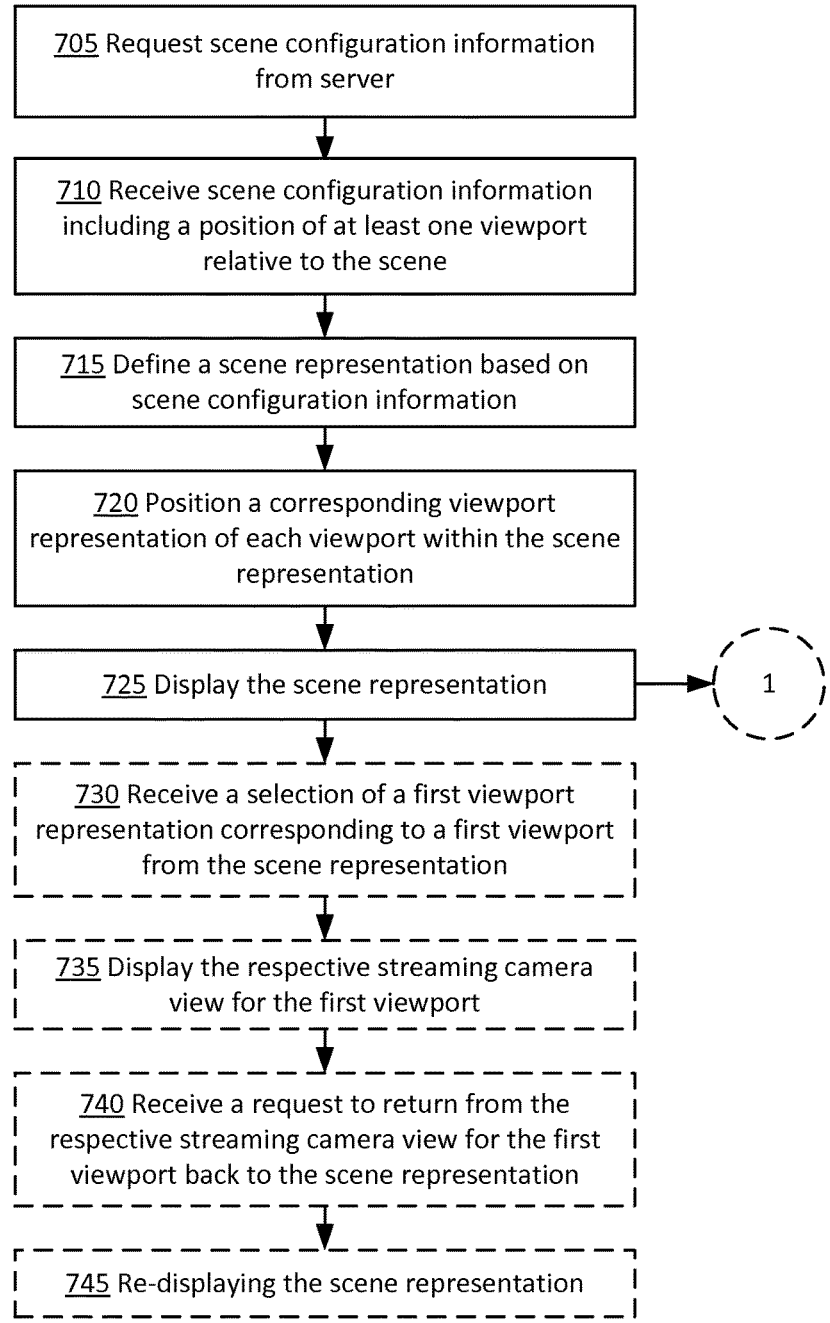
FIGS. 7A and 7B illustrate an example method for enabling viewport selection in a scene representation, in accordance with the present disclosure.
Figure 7B:
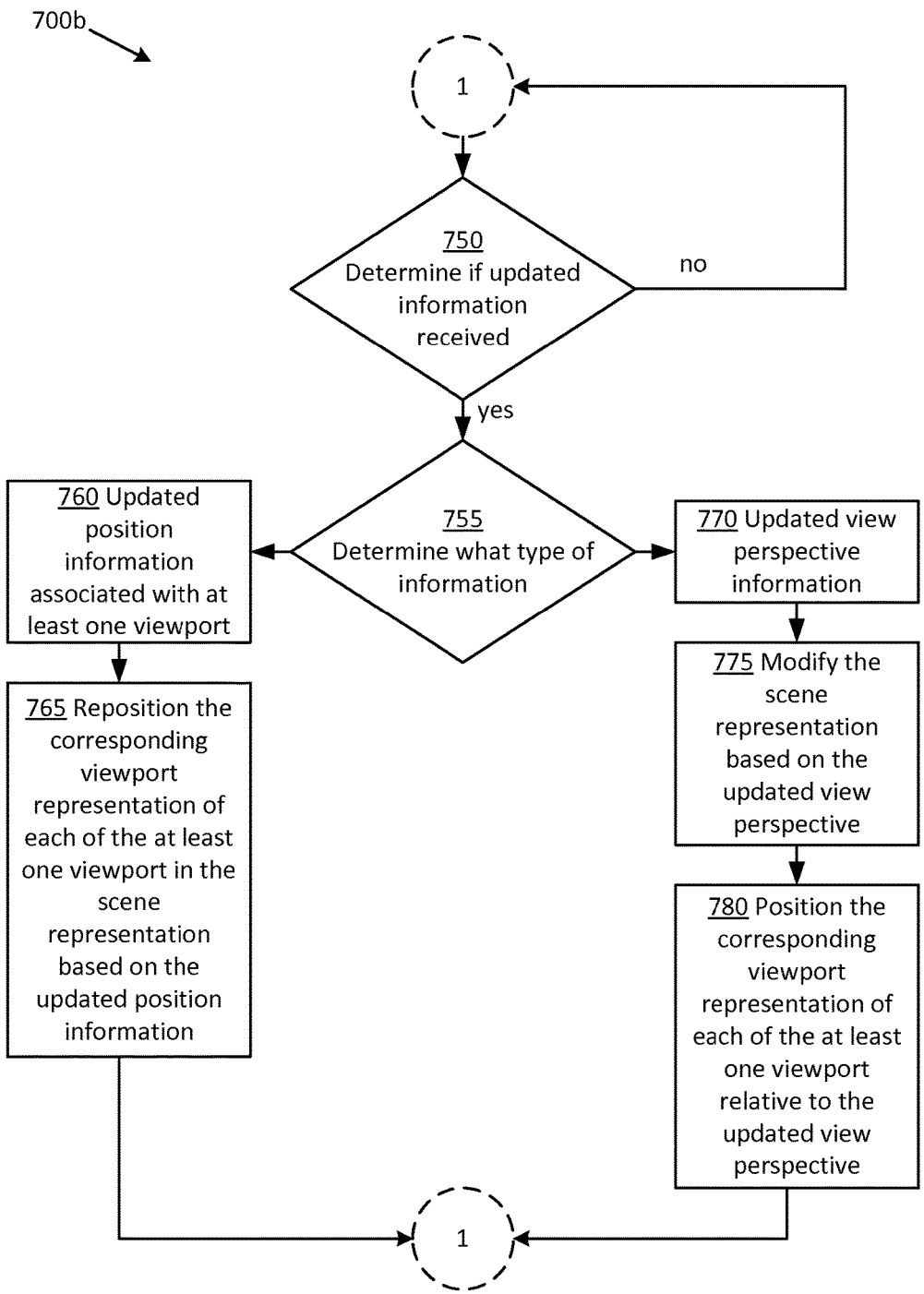

FIGS. 7A and 7B show an example process 700a and 700b (collectively process 700) for enabling selection of one or more viewports associated with a streaming camera view from a scene representation. Process 700 may be implemented, for example, by any of systems 100 or 600. In some cases, one or more clients 105, and/or servers 115, may perform the operations described below. Additionally or alternatively, process 700 may, for example, generate and include scene representations 205 and streaming camera views 315 described above.

Process 700 may begin at operation 705, where scene configuration information may be requested from a server, for example by a client, such as client 105. In some aspects, the server, such as server 115, may access and/or generate scene configuration information, including position information of one or more viewports associated with the scene, and send the information to the client device. The scene configuration information, including a position of at least one viewport relative to the scene, may be received, for example by the client device, at operation 710. Next, the client device may define a scene representation based, at least in part, on scene configuration information at operation 715. In some cases, defining a scene representation may include defining a two or three dimensional model, for example, based on a view perspective associated with the scene. A viewport representation corresponding to each viewport/camera associated with the scene representation may be positioned within the scene representation at operation 720. A position of each of the viewport representations within the scene representation may be determined based, at least in part, on the scene configuration information. The scene representation, including at least one viewport representation, may then be displayed at 725.

In some aspects, process 700 may proceed to operation 750 as shown in FIG. 7B, where it may be determined if updated information associated with the scene representation is received, for example, from a user. If no updated information is received, process 700b may return to operation 730, as shown in FIG. 7A, which will be described below. If updated information is received at operation 750, the type of information may then be determined at operation 755. In the case it is determined that updated position information associated with at least one viewport is received at operation 760, process 700b may proceed to operation 765, where the corresponding viewport representation of at least one viewport in the scene representation may then be repositioned based on the updated position information at operation 765.

In the event it is determined that updated perspective information is received at operation 770, the scene representation may then be modified based on the updated view perspective at operation 775. The corresponding viewport representation of each of the at least one viewport may then be positioned/repositioned within the scene representation relative to the updated view perspective at operation 780. In some cases, operation 780 may include positioning/repositioning one or multiple viewport representations in the scene representation.

In either case, after operation 765 or operation 780, process 700 may, in some cases, continue to operation 730, where a selection of a first viewport representation from the scene representation may be received. The respective streaming camera view associated with the selected viewport representation may then be displayed at operation 735. In some aspects, a request to return from the respective streaming camera view for the first viewport back to the scene representation may be received at operation 740. Accordingly, the scene representation may be re-displayed at operation 745.

As should be appreciated, at any time, updated scene information may be provided by the server corresponding to a new and/or modified scene or scenes or any portions thereof. For example, in some cases, a video game may change locations or settings, such as during a change in levels or when a character moves from one location or setting to another. In such cases, the scene configuration information may be updated, and a new or modified scene representation may be generated accordingly using techniques such as those set forth above.

Figure 8:
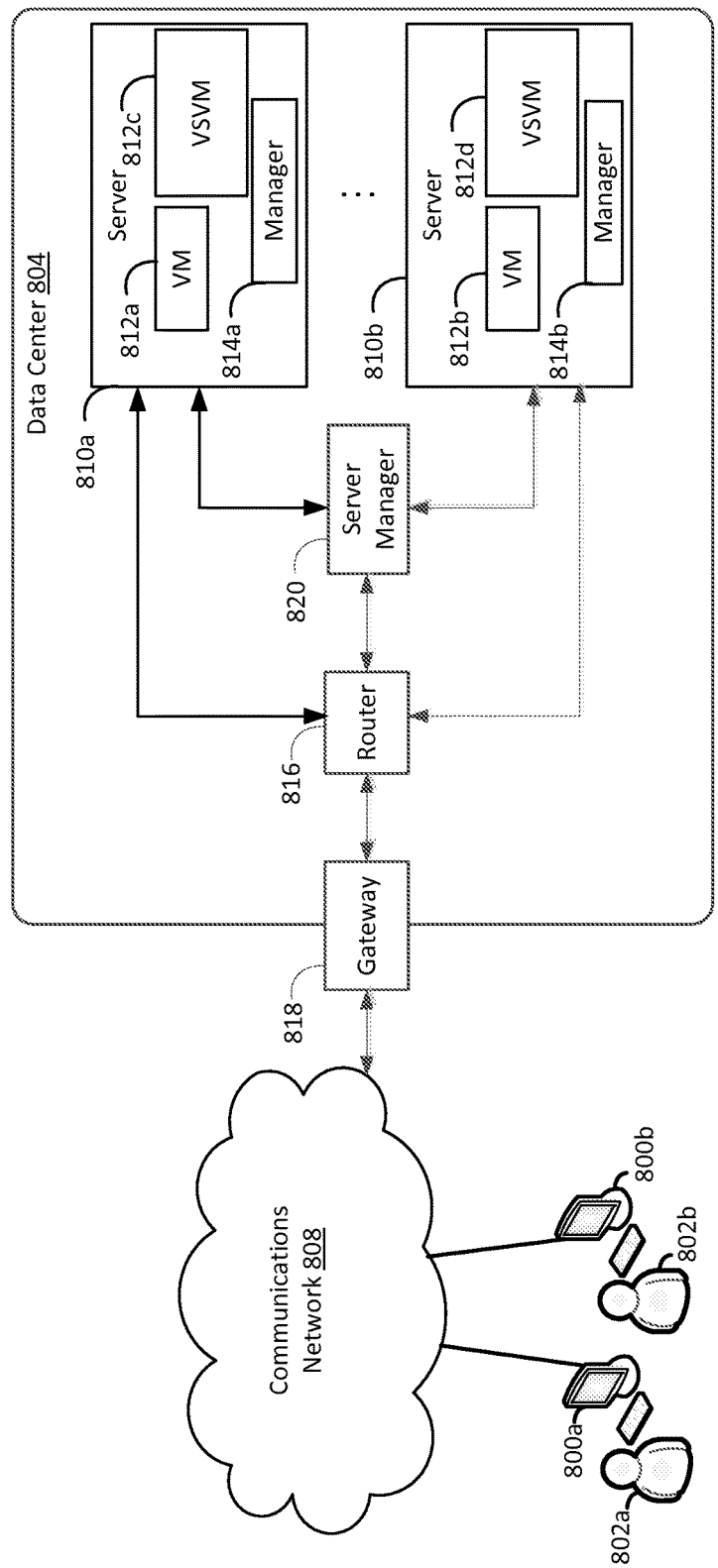
FIG. 8 is a diagram illustrating an example computing system that may be used in some embodiments.

An example computing environment that may be used to enable selection of one or more viewports associated with a streaming camera view from a scene representation will now be described in detail. In particular, FIG. 8 illustrates an example computing environment in which the embodiments described herein may be implemented. FIG. 8 is a diagram schematically illustrating an example of a data center 804 that can provide computing resources to users or viewers 802a and 802b (which may be referred herein singularly as user 802 or in the plural as users 802) via user computers 800a and 800b (which may be referred herein singularly as computer 800 or in the plural as computers 800) via a communications network 808. User computers 800a and 800b may be an example of client devices or computing nodes 105 as described above. Data center 804 may be configured to provide computing resources for executing applications on a permanent or an as-needed basis. The computing resources provided by data center 804 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, application services, media services, database services, processing services, gateway services, storage services, routing services, security services, encryption services, load balancing services, application services, and the like. These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resources may be available in different sizes, such as large resources— consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 804 may include servers 810a-b (which may be referred herein singularly as server 810 or in the plural as servers 810) that provide computing resources. One or more servers 810 may be an example of 115 described above. These resources may be available as bare metal resources, or as virtual machine instances 812a-d and (which may be referred herein singularly as virtual machine instance 812 or in the plural as virtual machine instances 812). Virtual machine instances 812c and 812d may be viewport selection virtual machine ("VSVM") instances. The VSVM virtual machine instances 812c and 812d may be configured to perform all or any portion of the techniques for enabling selection of one or more viewports associated with a streaming camera view from a scene representation as described in detail above. As should be appreciated, while the particular example illustrated in FIG. 8 includes one VSVM virtual machine in each server, this is merely an example. A server may include more than one VSVM virtual machine or may not include any VSVM virtual machines.

Referring to FIG. 8, communications network 808 may, for example, be a publicly accessible network of linked networks and possibly operated by various distinct parties, such as the Internet. In other embodiments, communications network 808 may be a private network, such as a corporate or university network that is wholly or partially inaccessible to non-privileged users. In still other embodiments, communications network 808 may include one or more private networks with access to and/or from the Internet.

Communication network 808 may provide access to computers 800. User computers 800 may be computers utilized by users 802 or other customers of data center 804. For instance, user computer 800a or 800b may be a server, a desktop or laptop personal computer, a tablet computer, a wireless telephone, a personal digital assistant (PDA), an e-book reader, a game console, a set-top box or any other computing device capable of accessing data center 804. User computer 800a or 800b may connect directly to the Internet (e.g., via a cable modem or a Digital Subscriber Line (DSL)). Although only two user computers 800a and 800b are depicted, it should be appreciated that there may be multiple user computers.

User computers 800 may also be utilized to configure aspects of the computing resources provided by data center 804. In this regard, data center 804 might provide a gateway or web interface through which aspects of its operation may be configured through the use of a web browser application program executing on user computer 800. Alternatively, a stand-alone application program executing on user computer 800 might access an application programming interface (API) exposed by data center 804 for performing the configuration operations. Other mechanisms for configuring the operation of various web services available at data center 804 might also be utilized.

Servers 810 shown in FIG. 8 may be standard servers configured appropriately for providing the computing resources described above and may provide computing resources for executing one or more web services and/or applications. In one embodiment, the computing resources may be virtual machine instances 812. In the example of virtual machine instances, each of the servers 810 may be configured to execute an instance manager 814a-b (which may be referred herein singularly as instance manager 814 or in the plural as instance managers 814) capable of executing the virtual machine instances 812. The instance managers 814 may be a virtual machine monitor (VMM) or another type of program configured to enable the execution of virtual machine instances 812 on server 810, for example, to simulate and test a content item, hybrid content item, or a portion thereof. As discussed above, each of the virtual machine instances 812 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 804 shown in FIG. 8, a router 816 may be utilized to interconnect the servers 810a and 810b. Router 816 may also be connected to gateway 818, which is connected to communications network 808. Router 816 may be connected to one or more load balancers, and alone or in combination may manage communications within networks in data center 804, for example by forwarding packets or other data communications as appropriate based, at least in part, on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 804 shown in FIG. 8, a server manager 820 is also employed to at least in part direct various communications to, from, and/or between servers 810a and 810b. While FIG. 8 depicts router 816 positioned between gateway 818 and server manager 820, this is merely an exemplary configuration. In some cases, for example, server manager 820 may be positioned between gateway 818 and router 816. Server manager 820 may, in some cases, examine portions of incoming communications from user computers 800 to determine one or more appropriate servers 810 to receive and/or process the incoming communications. Server manager 820 may determine appropriate servers to receive and/or process the incoming communications based, at least in part, on factors such as an identity, location or other attributes associated with user computers 800, a nature of a task with which the communications are associated, a priority of a task with which the communications are associated, a duration of a task with which the communications are associated, a size and/or estimated resource usage of a task with which the communications are associated and many other factors. Server manager 820 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 804 described in FIG. 8 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, gaming devices or consoles, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules or components may in some embodiments be combined in fewer modules or components or distributed in additional modules or components. Similarly, in some embodiments the functionality of some of the illustrated modules or components may not be provided and/or other additional functionality may be available.

In at least some embodiments, one or more of servers 810*a*, 810*b* may communicate with one or more cameras or virtual cameras, and may stream image data received from the one or more cameras to user computes 800, for example, to enable to the techniques described above.

Figure 9:
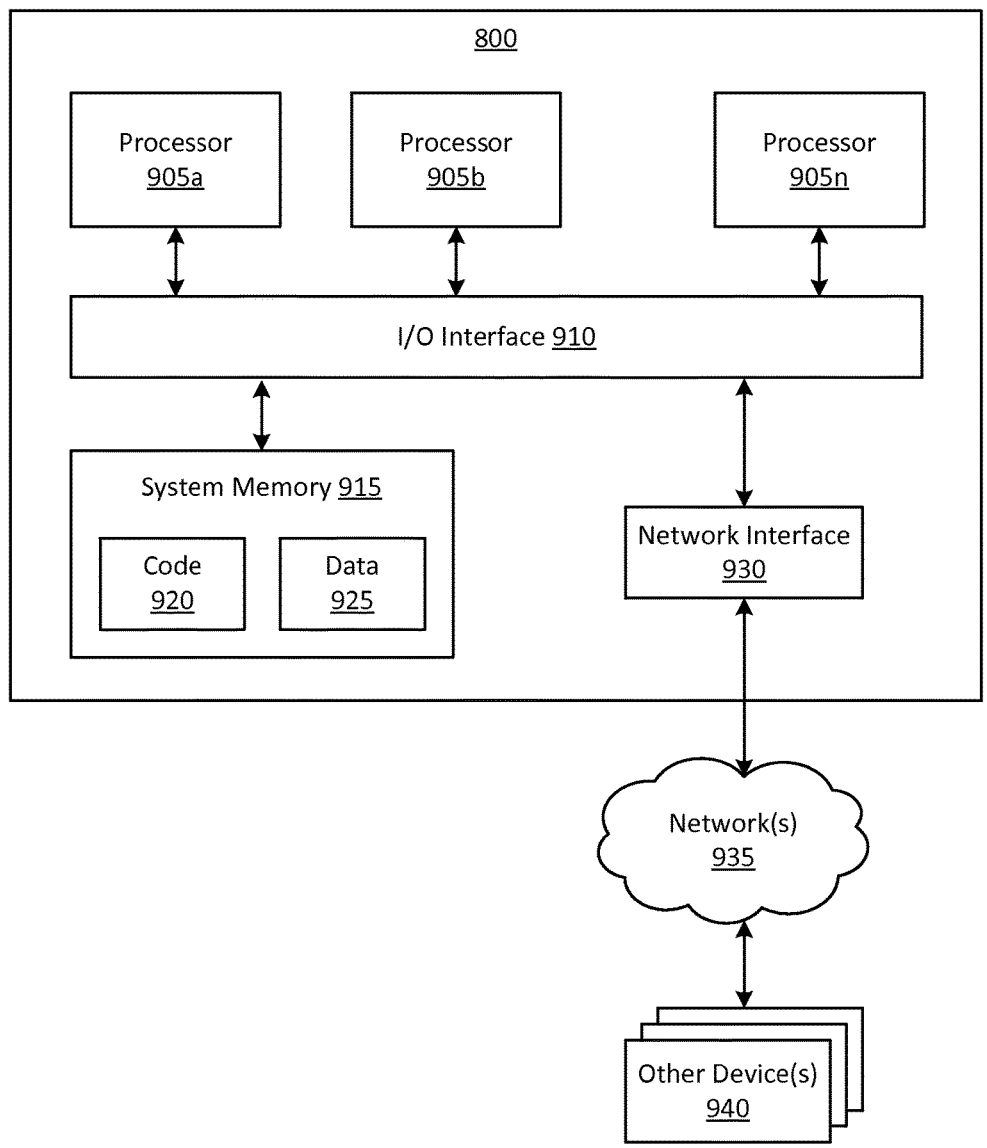
FIG. 9 is a diagram illustrating another example computing system that may be used in some embodiments.

FIG. 9 depicts an example of a general-purpose computer system including a computing device 800 in communication with other devices 940 that is configured to enable selection of one or more viewports associated with a streaming camera view from a scene representation, in accordance with various embodiments described herein. In the illustrated embodiment, computing device 800 includes one or more processors 905*a*, 905*b* through 905*n* (which may be referred herein singularly as "a processor 905" or in the plural as "the processors 905") coupled to a system memory 915 via an input/output (I/O) interface 910. Computing device 800 further includes a network interface 930 coupled to the I/O interface 910, by which computing device 800 may communicate with other devices 940.

In various embodiments, computing device 800 may be a uniprocessor system including one processor 905 or a multiprocessor system including several processors 905 (e.g., two, four, eight or another suitable number). Processors 905 may be any suitable processors capable of executing instructions. For example, in various embodiments, processors 905 may be general-purpose or embedded processors implementing any of a variety of instruction set architectures (ISAs), such as the x86, PowerPC, SPARC or MIPS ISAs or any other suitable ISA. In multiprocessor systems, each of processors 905 may commonly, but not necessarily, implement the same ISA.

System memory 915 may be configured to store instructions and data accessible by processor(s) 905. In various embodiments, system memory 915 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 915 as code 920 and data 925.

In one embodiment, I/O interface 910 may be configured to coordinate I/O traffic between processor 905, system memory 915 and any peripherals in the device, including network interface 930 or other peripheral interfaces. In some embodiments, I/O interface 910 may perform any necessary protocol, timing or other data transformations to convert data signals from one component (e.g., system memory 915) into a format suitable for use by another component (e.g., processor 905). In some embodiments, I/O interface 910 may include support for devices attached through various types of peripheral buses, such as a variant of the Peripheral Component Interconnect (PCI) bus standard or the Universal Serial Bus (USB) standard, for example. In some embodiments, the function of I/O interface 910 may be split into two or more separate components, such as a north bridge and a south bridge, for example. Also, in some embodiments some or all of the functionality of I/O interface 910, such as an interface to system memory 915, may be incorporated directly into processor 905. In some cases, the I/O interface 910 may include support for multiple input devices including gaming devices, controllers, keyboards, and the like, and presentation devices including speakers, display devices, etc.

Network interface 930 may be configured to allow data to be exchanged between computing device 800 and other device or devices 940 attached to a network or networks 935, such as other computer systems, devices, or servers (e.g., servers 115 or 810), for example. In various embodiments, network interface 930 may support communication via any suitable wired or wireless general data networks, such as types of Ethernet networks, for example. Additionally, network interface 930 may support communication via telecommunications/telephony networks such as analog voice networks or digital fiber communications networks, via storage area networks ("SANs") such as Fibre Channel SANs or via any other suitable type of network and/or protocol.

In some embodiments, system memory 915 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 910. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 800 as system memory 915 or another type of memory. Further, a computer-accessible medium may include transmission media or signals such as electrical, electromagnetic or digital signals conveyed via a communication medium such as a network and/or a wireless link, such as those that may be implemented via network interface 930. Portions or all of the computing device 800 and/or portions or all of other devices 940 illustrated in FIG. 9 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OSs) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for enabling viewport selection comprising:
    receiving scene configuration information including a changeable view perspective and at least one position of at least one viewport relative to a scene, each viewport associated with a respective streaming camera view;
    defining a scene representation based, at least in part, on the scene configuration information;
    positioning a corresponding viewport representation of each of the at least one viewport within the scene representation, wherein each viewport representation is positioned in the scene representation based, at least in part on, the changeable view perspective and the at least one position of the at least one viewport relative to the scene, and wherein each viewport representation allows the respective streaming camera view associated with a corresponding viewport to be displayed; and
    displaying the scene representation.

2. The method of claim 1, wherein each viewport representation allows the respective streaming camera view associated with the corresponding viewport to be displayed by selecting each viewport representation.

3. The method of claim 1, wherein each viewport representation comprises at least one of an image associated with the respective streaming camera view or video associated with the respective streaming camera view.

4. The method of claim 1, wherein the scene representation allows at least one of adding a viewport, deleting a viewport, or setting options associated with a viewport.

5. The method of claim 1, further comprising:
    receiving updated position information associated with at least one viewport; and
    repositioning the corresponding viewport representation of each of the at least one viewport in the scene representation based, at least in part, on the updated position information.

6. The method of claim 1, further comprising:
    receiving a selection of a first viewport representation corresponding to a first viewport from the scene representation; and
    displaying the respective streaming camera view for the first viewport.

7. The method of claim 6, further comprising:
    receiving a request to return from the respective streaming camera view for the first viewport back to the scene representation; and
    re-displaying the scene representation.

8. One or more non-transitory computer-readable storage media having stored thereon instructions that, upon execution on at least one compute node, cause the at least one compute node to perform operations comprising:
    receiving scene configuration information including a changeable view perspective and at least one position of at least one viewport relative to a scene, each viewport associated with a respective streaming camera view;

defining a scene representation based, at least in part, on the scene configuration information;

positioning a corresponding viewport representation of each of the at least one viewport within the scene representation, wherein each viewport representation is positioned in the scene representation based, at least in part on, the changeable view perspective and the at least one position of the at least one viewport relative to the scene, and wherein each viewport representation allows the respective streaming camera view associated with a corresponding viewport to be displayed; and displaying the scene representation.

9. The one or more non-transitory computer-readable storage media of claim 8, wherein each viewport representation allows the respective streaming camera view associated with the corresponding viewport to be displayed by selecting each viewport representation.

10. The one or more non-transitory computer-readable storage media of claim 8, wherein each viewport representation comprises at least one of an image associated with the respective streaming camera view or video associated with the respective streaming camera view.

11. The one or more non-transitory computer-readable storage media of claim 8, wherein the scene representation allows at least one of adding a viewport, deleting a viewport, or setting options associated with a viewport.

12. The one or more non-transitory computer-readable storage media of claim 8, wherein the operations further comprise:

receiving updated position information associated with at least one viewport; and repositioning the corresponding viewport representation of each of the at least one viewport in the scene representation based, at least in part, on the updated position information.

13. The one or more non-transitory computer-readable storage media of claim 8, wherein the operations further comprise:

receiving a selection of a first viewport representation corresponding to a first viewport from the scene representation; and displaying the respective streaming camera view for the first viewport.

14. The one or more non-transitory computer-readable storage media of claim 13, wherein the operations further comprise:

receiving a request to return from the respective streaming camera view for the first viewport back to the scene representation; and re-displaying the scene representation.

15. A system comprising:

one or more processors; and one or more memories to store a set of instructions, which if executed by the one or more processors, causes the one or more processors to perform operations comprising:

receiving scene configuration information including a changeable view perspective and at least one position of at least one viewport relative to a scene, each viewport associated with a respective streaming camera view;

defining a scene representation based, at least in part, on the scene configuration information;

positioning a corresponding viewport representation of each of the at least one viewport within the scene representation, wherein each viewport representation is positioned in the scene representation based, at least in part on, the changeable view perspective and the at least one position of the at least one viewport relative to the scene, and wherein each viewport representation allows the respective streaming camera view associated with a corresponding viewport to be displayed; and displaying the scene representation.

16. The system of claim 15, wherein each viewport representation allows the respective streaming camera view associated with the corresponding viewport to be displayed by selecting each viewport representation.

17. The system of claim 15, wherein each viewport representation comprises at least one of an image associated with the respective streaming camera view or video associated with the respective streaming camera view.

18. The system of claim 15, wherein the scene representation allows at least one of adding a viewport, deleting a viewport, or setting options associated with a viewport.

19. The system of claim 15, wherein the operations further comprise:

receiving updated position information associated with at least one viewport; and repositioning the corresponding viewport representation of each of the at least one viewport in the scene representation based, at least in part, on the updated position information.

20. The system of claim 15, wherein the operations further comprise:

receiving a selection of a first viewport representation corresponding to a first viewport from the scene representation; and displaying the respective streaming camera view for the first viewport.

* * * * *